US007103204B1

(12) United States Patent  
Celler et al.

(10) Patent No.: US 7,103,204 B1  
(45) Date of Patent: Sep. 5, 2006

(54) METHOD AND APPARATUS FOR PRODUCING A REPRESENTATION OF A MEASURABLE PROPERTY WHICH VARIES IN TIME AND SPACE, FOR PRODUCING AN IMAGE REPRESENTING CHANGES IN RADIOACTIVITY IN AN OBJECT AND FOR ANALYZING TOMOGRAPHY SCAN IMAGES

(75) Inventors: Anna Malgorzata Celler, North Vancouver (CA); Dominikus Rudolf Noll, Lauzerville (FR); Troy Howard Farncombe, Vancouver (CA); Jean Maeght, Toulouse (FR)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 09/435,458

(22) Filed: Feb. 15, 2000

Related U.S. Application Data

(60) Provisional application No. 60/107,335, filed on Nov. 6, 1998.

(51) Int. Cl.  
*G06K 9/00* (2006.01)

(52) U.S. Cl. .................. 382/131; 382/128

(58) Field of Classification Search .......... 382/128, 382/131; 250/363.02; 600/443  
See application file for complete search history.

(56) References Cited

U.S. PATENT DOCUMENTS

| | | | | |
|---|---|---|---|---|
| 4,802,147 A | * | 1/1989 | Moeckel | 367/57 |
| 5,565,684 A | * | 10/1996 | Gullberg et al. | 250/363.04 |
| 5,924,989 A | * | 7/1999 | Polz | 600/443 |
| 6,075,836 A | * | 6/2000 | Ning | 378/98.12 |
| 6,947,584 B1 | * | 9/2005 | Avila et al. | 382/131 |

OTHER PUBLICATIONS

Eugene Veklerov, "How to Compute the Difference between Tomographic Images", IEEE Transactions on Medical Imaging, vol. 13, No. 3, Sep. 1994, pp. 566-569.

H.H. Bauschke, D. Noll, A. Celler and J.M. Borwein, "An EM algorithm for Dynamic SPECT", IEEE Trans. Med. Img. vol. 18, No. 3, Mar. 1999, pp. 252-261.

A. Celler, T. Farncombe, R. Harrop and D. Lyster, "Dynamic Heart-in-Thorax Phantom for Functional SPECT", IEEE Trans. Nucl. Sci. vol. 44, No. 4, Aug. 1997, pp. 1600-1605.

(Continued)

*Primary Examiner*—Jingge Wu  
*Assistant Examiner*—Tom Y. Lu  
(74) *Attorney, Agent, or Firm*—Paul W. Vapnek; Townsend and Townsend and Crew, LLP

(57) ABSTRACT

A method, apparatus, medium and signal for producing a representation of a measurable property which varies in time and space are disclosed. The apparatus includes a receiver for receiving a plurality of sets of values representing measurements of the property across the object at respective measurement times, each set being associated with a respective measurement time. The apparatus further includes a processor circuit in communication with the receiver. The processor circuit is programmed to produce a plurality of sets of values representing the property at a plurality of locations throughout the object at the respective measurement times, by minimizing a figure of merit function relating the values representing the measurements with the values representing the property at the plurality of locations, with a shape constraint imposed on the values representing the property at the plurality of locations.

40 Claims, 6 Drawing Sheets

OTHER PUBLICATIONS

E. Hebber, D. Oldenburg, T. Farncombe, A. Celler, "Direct Estimation of Dynamic Parameters in SPECT Tomography", IEEE Trans. Nucl. Sci. vol. 44, No. 6, Dec. 1997, pp. 2425-2430.

M.A. Limber, M.N. Limber, A. Celler, J.S. Barney and J.M. Borwein, "Direct Reconstruction of Functional Parameters for Dynamic SPECT", IEEE Trans. Nucl. Sci. vol. 42, No. 4, Aug. 1995, pp. 1249-1256.

T. Farncombe, A. Celler, D. Noll, J. Maeght and R. Harrop, "Dynamic SPECT Imaging Using a Single Camera Rotation (dSPECT)", IEEE Trans. Nucl. Sci. vol. 46, No. 4, Aug. 1999, pp. 1055-1061.

A. Celler, T. Farncombe, D. Noll, J. Maeght and R. Harrop, Abstract "Kinetic Parameter Estimation from Dynamic SPECT Studies", Proc. 45th Annual Society of Nuclear Medicine Meeting, Toronto, Ontario, Jun. 7-11, 1998.

T. Farncombe, A. Celler, D. Noll, J. Maeght and R. Harrop, "An Evaluation of Dynamic SPECT Imaging Methods", IEEE NSS/MIC 1998 Conference Proceedings, Toronto, Ontario, Nov. 11-14, 1998.

A. Celler, T. Farncombe, R. Harrop, D. Noll, J. Maeght and D. Lyster, "Three Approaches to Dynamic SPECT Imaging", IEEE NSS/MIC 1997 Conference Proceedings, Albuquerque, New Mexico, Nov. 13-15, 1997.

A. Celler, T. Farncombe, D. Noll, J. Maeght and R. Harrop, "Optimization of Acquisition and Reconstruction Protocols for Dynamic Single Photon Emission Computed Tomography (dSPECT)", Proc. 1999 International Meeting on Fully Three-Dimensional Image Reconstruction in Radiology and Nuclear Medicine, Egmond aan Zee, The Netherlands, Jun. 23-26, 1999, pp. 189-192.

T. Farncombe, A. Celler, D. Noll, J. Maeght and R. Harrop, Abstract "A Method for Dynamic SPECT Imaging Using Any Camera Geometry", Proc. Canadian Society of Nuclear Medicine Annual Scientific Meeting, Banff, Alberta, Mar. 27-31, 1999, p. 25.

A. Celler, T. Farncombe and R. Harrop, "Functional Dynamic SPECT Imaging", 43rd Annual Scientific Meeting of the Canadian Organization of Medical Physicists, Charlottetown, P.E.I., Jul. 10-12, 1997, pp. 200-202.

A. Celler, T. Farncombe, R. Harrop and D. Lyster, "Dynamic Heart-in-Thorax Phantom for Functional SPECT", IEEE NSS/MIC 1996 Conference Proceedings, Anaheim, California, Nov. 1996, pp. 1893-1897.

E. Haber, D. Oldenburg, T. Farncombe and A. Celler, "Quantitative Dynamic SPECT Tomography", IEEE NSS/MIC 1996 Conference Proceedings, Anaheim, California, Nov. 1996, pp. 1876-1880.

A. Celler, L. van de Lagemaat, T. Farncombe, R. Harrop and D. Lyster, Abstract "Thorax Phantom for Dynamic Functional SPECT Imaging", 1996 Society of Nuclear Medicine Meeting, Denver, Colorado, Jun. 1996, J. Nucl. Med., vol. 37, No. 5, May. 1996 Supplement, p. 219P.

A. Celler, M.A. Limber, M.N. Limber, J.S. Barney, J.M. Borwein and D. Lyster, "Dynamic SPECT Imaging", Proc. 4th Medical Physics Workshop: Functional and Quantitative Imaging, Vancouver, British Columbia, Oct. 1995.

A. Celler, J.S. Barney, D. Lyster, M.N. Limber and M.A. Limber, Abstract "Dynamic SPECT for Assessment of Myocardial Viability", 6th World Congress of the World Federation of Nuclear Medicine and Biology, Sydney, Australia, Oct. 1994, Eur. J. Nucl. Med., vol. 21 (Suppl.), p. S-65.

M.A. Limber, M.N. Limber, A. Celler, J.S. Barney and J.M. Borwein, "Direct Reconstruction of Functional Parameters for Dynamic SPECT", IEEE Medical Imaging Conference, Norfolk, Virginia, Nov. 1994, IEEE NSS/MIC 1994 Conference Proceedings, pp. 1207-1211.

H.H. Bauschke, D. Noll, A. Celler and J.M. Borwein, "An EM-algorithm for Dynamic SPECT Tomography", CECM (Simon Fraser University) Internal Research Report 997-092, Mar. 1997.

T. Farncombe, A. Celler, C. Bever, D. Noll, J. Maeght and R. Harrop, "The Incorporation of Organ Uptake into Dynamic SPECT (dSPECT) Image Reconstruction", IEEE Medical Imaging Conference, Seattle, Washington, Oct. 1999, IEEE NSS/MIC 1999 Conference Proceedings.

J.M. Borwein, W. Sun, "The Stability Analysis of Dynamic SPECT Systems", Numerische. Math, 77 (1977), pp. 283-298.

* cited by examiner

METHOD AND APPARATUS FOR PRODUCING A REPRESENTATION OF A MEASURABLE PROPERTY WHICH VARIES IN TIME AND SPACE, FOR PRODUCING AN IMAGE REPRESENTING CHANGES IN RADIOACTIVITY IN AN OBJECT AND FOR ANALYZING TOMOGRAPHY SCAN IMAGES

RELATED APPLICATIONS

This application claims priority from U.S. provisional application Ser. No. 60/107,335, filed Nov. 6, 1998.

FIELD OF THE INVENTION

The present invention relates to dynamic data analysis, and more particularly to methods and apparatus for producing a representation of a measurable property which varies in time and space, for producing an image representing changes in radioactivity in an object and for analyzing tomography scan images.

BACKGROUND OF THE INVENTION

In recent years, nuclear medicine procedures have been increasingly used to trace distributions of various substances in the human body. Typically, radioisotope-tagged pharmaceuticals (radiopharmaceuticals) are administered to a subject, which may be a human or an animal, for example. Common imaging techniques, such as Single Photon Emission Computed Tomography (SPECT), for example, are then used to measure radiation from the radiopharmaceuticals to produce data and/or images representing the three-dimensional distribution of the radiopharmaceuticals in the subject's body or in a particular organ or region thereof. Scans of this nature may be used for clinical diagnosis of sick patients, for example.

Current SPECT visualization is generally performed under the assumption that the spatial distribution of the radiopharmaceuticals in the subject's body is static throughout the duration of the scan, typically 20–25 minutes. However, physiological processes in the human body are usually dynamic, therefore many organs, such as the kidney and heart, for example, tend to show significant changes in activity distribution over time due to uptake ("washin") or due to "washout" of the radiopharmaceuticals.

Moreover, it is presently thought that the rates of infusion and subsequent extraction of such radiopharmaceuticals from the tissue provide good indications of organ function. Therefore, while current SPECT technology and methods are useful for measuring a static distribution of a substance, they are not suitable for measuring dynamic physiological processes, such as kidney or heart function, for example, which require dynamic data representing the "washin" or "washout" rates of the substance.

In other words, measurement of physiological processes requires four-dimensional dynamic data representing both the spatial and temporal distributions of the radiopharmaceutical.

Other technologies exist for producing dynamic data of this general nature, however, such technologies suffer from a number of disadvantages.

One technique involves fast rotations around the subject with a SPECT camera. However, due to the relatively high speed at which the camera moves, very few counts are received at any given camera location. This method therefore produces statistically unreliable data, resulting in poor spatial resolution. Additionally, this technique is generally incompatible with the majority of transmission scan-based attenuation correction methods. Equipment for performing this technique is rarely available in hospitals.

Ring SPECT devices may also suffer from statistically unreliable data. Typically, each of the detectors forming the ring receives a relatively low number of counts, resulting in a low signal to noise ratio. Ring SPECT devices are also expensive and are typically not available in hospitals, being used mainly for research.

Similarly, Positron Emission Tomography (PET) devices are also prohibitively expensive, and are not available in many hospitals. PET equipment is much more complex than SPECT equipment, and the PET technique requires a cyclotron in proximity to or in the hospital in which the PET equipment is housed. In addition, PET and SPECT use different isotopes and radiopharmaceuticals, and are therefore complementary. In addition, data analysis may be cumbersome with the PET technique, wherein typically 64 or 128 projections or input images are required to produce each reconstructed image.

Planar imaging is commonly available in hospitals. However, this technique generally involves acquiring a series of fast images, typically 1–10 seconds, which sometimes results in a low signal-to-noise ratio. The camera generally remains at a fixed position, resulting in limited spatial resolution, an inability to produce three-dimensional images of the object of interest and an inability to perform proper attenuation correction.

More generally, existing dynamic analysis methods generally assume that the activity of each three-dimensional pixel or "voxel" of the area of interest behaves according to a particular functional model, such as exponential decay or biexponential decay, for example. One such method, Factor Analysis of Dynamic Structures (FADS), proposes a "menu" of possible dynamic profiles or basis functions, sometimes referred to as "factors", which may include exponential or biexponential functions for example. FADS attempts to fit a linear combination of such basis functions to the measured data. However, the exponential or other functional models imposed on the data may not apply in some situations, and in such a case this technique may fail. This method may also fail due to inherent numerical instabilities if the number of dynamic pixels is high. In addition, existing dynamic analysis methods are cumbersome and time-consuming, and often require as much as one to two hours or more of computing time to complete the data analysis using contemporary desktop computers.

Accordingly, there is a need for a way to produce a representation of a measurable property which varies in time and space. More particularly, there is a need for ways to produce an image representing changes in radioactivity in an object and to use standard nuclear medicine equipment currently available in most hospitals, to quickly produce dynamic data representing physiological processes over time, without sacrificing the resolution or reliability of the data, and without requiring the data to satisfy any predetermined form of function.

SUMMARY OF THE INVENTION

The present invention addresses the above need by providing a computer implemented method of producing a representation of a measurable property which varies in time and space. A plurality of sets of values representing measurements of the property across an object are received, each set being associated with a respective measurement time. A plurality of sets of values representing the property at a plurality of locations throughout the object at the respective measurement times are then produced. This is achieved by minimizing a figure of merit function which relates the values representing the measurements with the values representing the property at the plurality of locations, subject to a shape constraint imposed on the values representing the property at the plurality of locations throughout the object.

Particular embodiments of the present invention provide a novel and inventive method of reconstruction using Shape Constrained Least Squares (SCLS) analysis. The figure of merit function is minimized without making any assumptions as to the precise functional form of the time variation of the measurable property, but rather, assuming only a shape constraint.

One particularly advantageous embodiment of the invention provides a Dynamic Single Photon Emission Computed Tomography (DSPECT) method and apparatus. Conventional SPECT imaging devices, such as those found in many modern hospitals, may be used to produce data representing tomography scan images of the object, which may be a functioning heart or kidney contained within a living person, for example, to which a radiopharmaceutical has been administered. In such a case, SCLS analysis according to the present invention produces dynamic data representing the time variation of the three-dimensional radioactivity distribution across the object, throughout the duration of the tomography scan, typically 20–25 minutes. This dynamic information may provide indications of organ function, for example, which cannot be obtained from conventional SPECT techniques in which the data is assumed to be static.

In this embodiment, the present invention therefore permits use of conventional equipment commonly available in hospitals to produce dynamic information previously obtainable only by use of expensive and/or rare equipment such as PET or Ring SPECT devices, for example. In addition, the use of conventional SPECT equipment results in a relatively high signal to noise ratio compared to certain types of equipment previously used to produce such dynamic information.

In contrast with analysis techniques previously used to produce dynamic data, such as Non-linear Least Squares (NLS) analysis, for example, the inventive SCLS analysis method disclosed herein provides for relatively fast data analysis, producing the dynamic data representing the time variation of the physical property in as little as ten minutes, for example, as compared to typical computing times of one to two hours or more with NLS analysis techniques. More importantly, the present invention does not assume any precise functional form of the dynamic data, such as the exponential or biexponential models commonly used in NLS analysis, which may not necessarily apply in all situations.

Examples of clinical applications of this embodiment of the invention may include renal studies using the dynamic tracers Tc-99 mMAG3 and Tc-99mDTPA used in planar renal imaging, Tc-99m labeled teboroxime studies used to investigate myocardial blood flow for detection of ischemia or infarction, myocardial viability studies using I-123 labeled fatty acids, or brain blood-flow imaging using Xe-133, Xe-127 or I-123, for example. The biological half-lives of any of these dynamic tracers is within the time scale of a typical scan of 20–25 minutes.

An apparatus for performing the foregoing method may include a receiver for receiving the plurality of sets of values representing the measurements of the property, and a processor circuit in communication with the receiver. The processor circuit is programmed to produce the plurality of sets of values representing the property at the plurality of locations throughout the object, according to the methods indicated above and herein.

In accordance with another aspect of the invention, there is provided a computer readable medium for providing computer readable instructions for directing a programmable device to implement the method indicated above. Similarly, another aspect of the invention involves providing a computer data signal embodied in a carrier wave, the data signal including code segments for directing a programmable device to implement the methods indicated above and herein.

According to yet another aspect of the invention, there is provided a method of producing an image representing changes of radioactivity in an object. The method includes receiving a plurality of sets of values representing tomography scan images across the object at respective measurement times, each set being associated with a respective measurement time. The method further includes producing a plurality of sets of values representing radioactivity at a plurality of locations throughout the object at the respective measurement times, by minimizing a figure of merit function relating the values representing the tomography scan images with the values representing radioactivity, with a shape constraint imposed on the values representing radioactivity. The method also includes producing a visual representation of the object in response to the plurality of sets of values representing radioactivity, the visual representation including a representation of radioactivity over time. An apparatus for performing the method includes a receiver for receiving the plurality of sets of values representing the tomography scan images, and a processor circuit programmed to produce the plurality of sets of values representing radioactivity, as indicated. The processor circuit is also programmed to produce a time varying graphical representation of the object in response to the plurality of sets of values representing radioactivity, and the apparatus also includes a display responsive to the graphical representation for producing a visual representation of the object in response to the graphical representation.

According to an additional aspect of the invention there is provided a method of using a processor to analyze data signals representing tomography scan images of an organic object. The method includes receiving data representing successive tomography scan images of the object, and performing calculations by imposing an inequality constraint to determine dynamic data values from the data. Each of the dynamic data values represents a physical property of the object at a respective corresponding one of a plurality of voxels of the object at a respective corresponding time. The method also includes producing a representation of the dynamic data values, representing the physical property at the voxels at the times.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
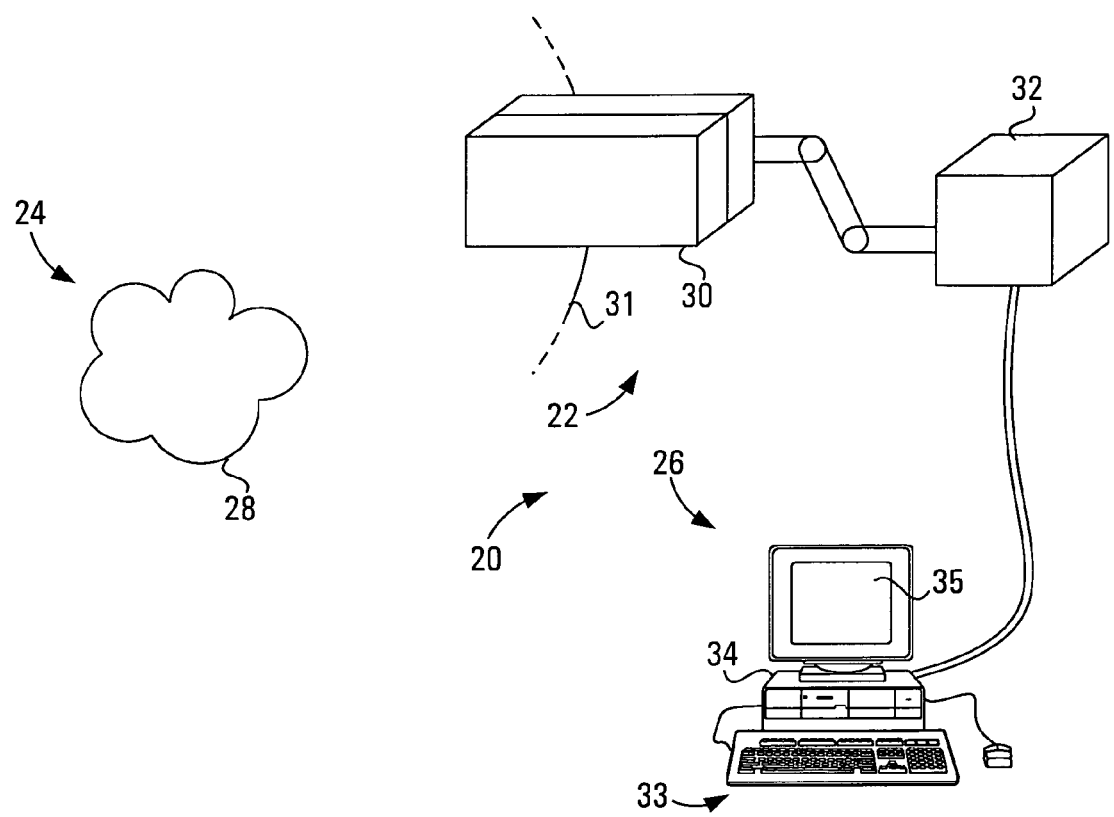
FIG. 1 is a schematic representation of a system for producing a representation of a measurable property which varies in time and space, according to a first embodiment of the invention.

As shown in FIG. 1, a system for producing a representation of a measurable property which varies in time and space is designated generally by the reference character 20. The system includes a data gathering device shown generally at 22 for producing signals or data values representing the measurable property of an object of interest 24 at respective measurement times, and a programmable device shown generally at 26.

In this embodiment, the system 20 includes a system for Dynamic Single Photon Emission Computed Tomography (DSPECT). The object 24 includes an organic object 28, such as a kidney or a heart, for example. The organic object 28 is preferably contained within a living organism (not shown) such as a human or an animal, for example.

Also in this embodiment, the programmable device 26 includes a desktop computer 34 having a user input device 33, which in this embodiment includes a keyboard and a mouse. The computer further has an output device, which in this embodiment includes a display device 35 for displaying a visual representation of the measurable property.

Data Gathering Device

Generally, the data gathering device 22 produces a plurality of sets of values representing measurements of the measurable property across the object 28 at respective measurement times. Each set of values is associated with a respective one of the measurement times.

As shown in FIG. 1, in this embodiment the data gathering device 22 includes a tomographic imaging device 30 and a control device 32 for moving the tomographic imaging device 30 relative to the organic object 28.

The control device 32 controls the tomographic imaging device 30 to move the tomographic imaging device along a 180° circumferential arc 31 about the object 28 at a radial distance of approximately 25 cm from the centre of the object. More particularly, in this embodiment the control device moves the tomographic imaging device among ninety discrete positions or stops along the 180° circumferential arc 31, with each stop lasting approximately 13 seconds, for a total data acquisition time over the complete arc 31 of approximately 20 minutes. At each stop, the tomographic imaging device produces values representing a tomography scan image of the object. These values are received and stored by the programmable device 26, following which the control device moves the tomographic imaging device to the next stop, and so on, until the 180° scan has been completed.

Alternatively, it will be appreciated that the number of stops, duration of each stop, arc length or angle of rotation and radial distance may be varied. Generally, distances as close as possible to the object may be preferred. The time duration of each stop may be tailored to a particular clinical problem, and will be related to the temporal resolution of the study. Where the object is an organ in a human, it has been found that between 60 and 120 stops along a 180° arc at a radial distance of 20 to 30 cm from the object is preferable.

Tomographic Imaging Device

Figure 2:
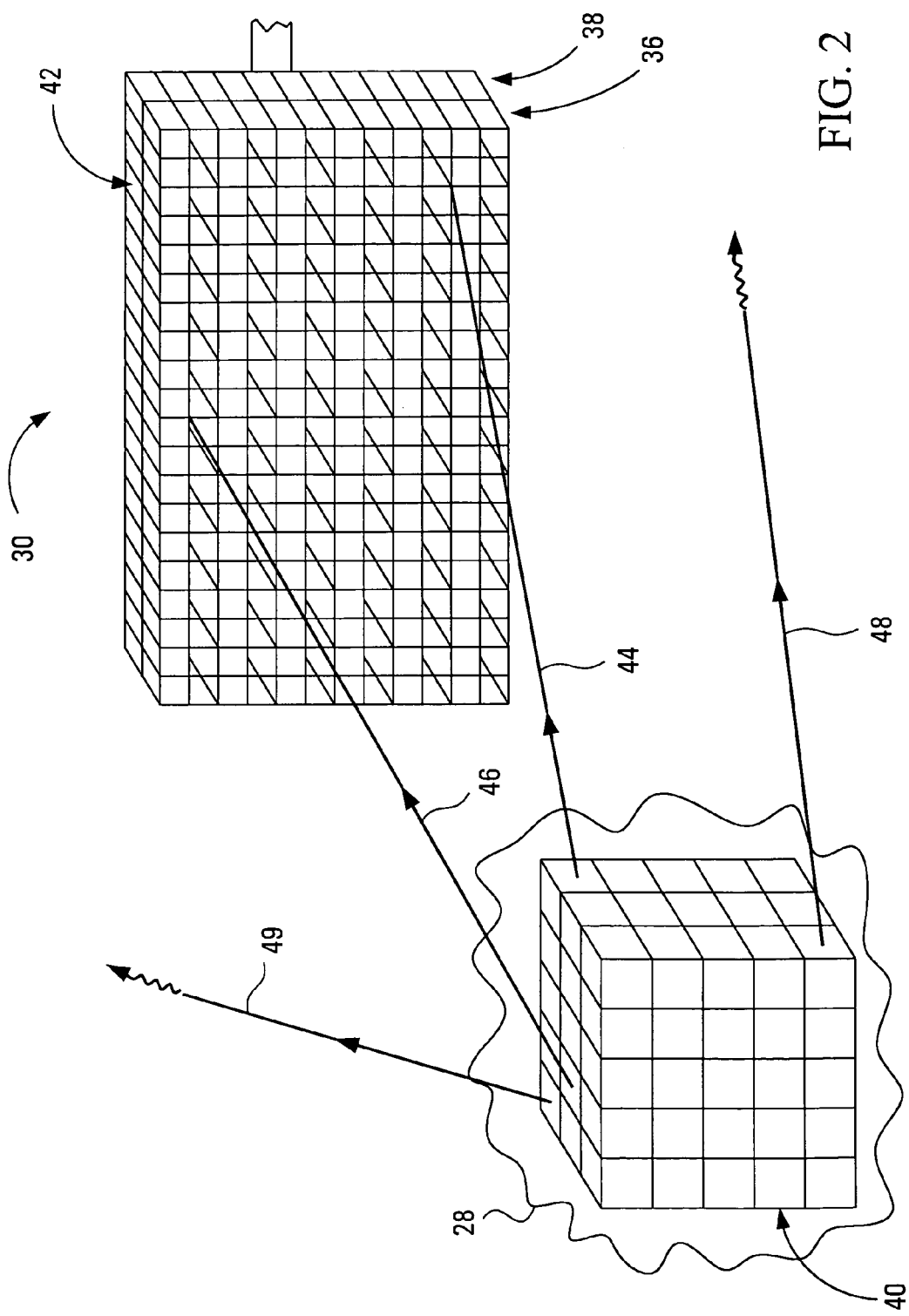
FIG. 2 is a fragmented schematic representation of an imaging device and an object shown in FIG. 1.

As shown in FIG. 2, the tomographic imaging device is designated generally by the reference character 30. Generally, the tomographic imaging device is used to produce successive sets of values representing successive tomography scan images across the object 28 at respective measurement times, each set of values being associated with a respective measurement time. In this embodiment, the tomographic imaging device includes a collimator 36 and a detector shown generally at 38. The tomographic imaging device may be conventional, however, any tomographic imaging device capable of performing the functions described herein may be substituted therefor. In this embodiment, the tomographic imaging device includes a Single Photon Emission Computed Tomography (SPECT) imaging device, which acts as a tomography scanner for measuring radioactivity across the object. Alternatively, the imaging device may include a dual or triple head camera to provide better accuracy, or a coincidence SPECT camera, for example. Preferably, the tomographic imaging device 30 is capable of performing a transmission scan to allow for better attenuation correction.

For analytical purposes, the object 28 is defined as comprising a plurality of cubical regions called voxels, some of which are shown generally at 40 in FIG. 2. Typically, the object may comprise 30×30×30 voxels of 1 $cm^3$ each, for example, however, for illustrative purposes the size of each voxel is exaggerated in FIG. 2.

Typically, a radioisotope-labelled pharmaceutical or "radiopharmaceutical" is injected or otherwise administered into the object 28. In this embodiment, the radioisotope is one that emits gamma radiation, such as Tc-99m, I-123 or Xe-127, for example. More particularly, in this embodiment the radiopharmaceutical includes Tc-99m labeled teboroxime. However, it will be appreciated that other radiopharmaceuticals may be substituted therefor.

Accordingly, in this embodiment the detector 38 includes a gamma ray detector, which in turn includes an array of receptor bins shown generally at 42 in FIG. 2. The detector 38 is approximately 30×40 cm, and each of the bins 42 is approximately 6×6 mm. In this embodiment, therefore, the array comprises approximately 50×66 receptor bins 42, for a total of approximately 3300 receptor bins. For illustrative purposes, however, the size of each bin is exaggerated in FIG. 2.

Referring to FIGS. 1 and 2, at each of the ninety stops of the tomographic imaging device 30 along the 180° circumferential arc 31 about the object 28, gamma radiation emitted by the object 28 is received at the bins 42 of the detector 38. The collimator 36 serves to absorb any gamma radiation which is not perpendicular or normal to the plane of the detector 38. For example, a first gamma photon 44 shown in FIG. 2 is not normal to the plane of the detector 38, and is therefore absorbed by a wall of the collimator 36 without reaching any of the bins 42. A second gamma photon 46 travelling normal to the plane of the detector 38 passes through the collimator 36 unaffected, and is absorbed at one of the bins 42 of the detector. Other gamma photons 48 and 49 may miss the tomographic imaging device entirely, and are not detected.

At each stop along the arc 31, the tomographic imaging device produces signals representing a tomography scan image. More particularly, the signals represent data values, each data value indicating the number of gamma photons or "counts" received at a particular corresponding bin 42 at that respective stop. Thus, for each stop, a set of data values representing the numbers of counts received at respective bins is produced. These sets of data values for each stop are transmitted from the tomographic imaging device 30 to the programmable device 26. It will be appreciated that as a result of the collimator, each tomography scan image produced at each of the stops of the tomographic imaging device represents a two-dimensional projection of the three-dimensional radioactivity in the object 28.

Programmable Device

Figure 3:
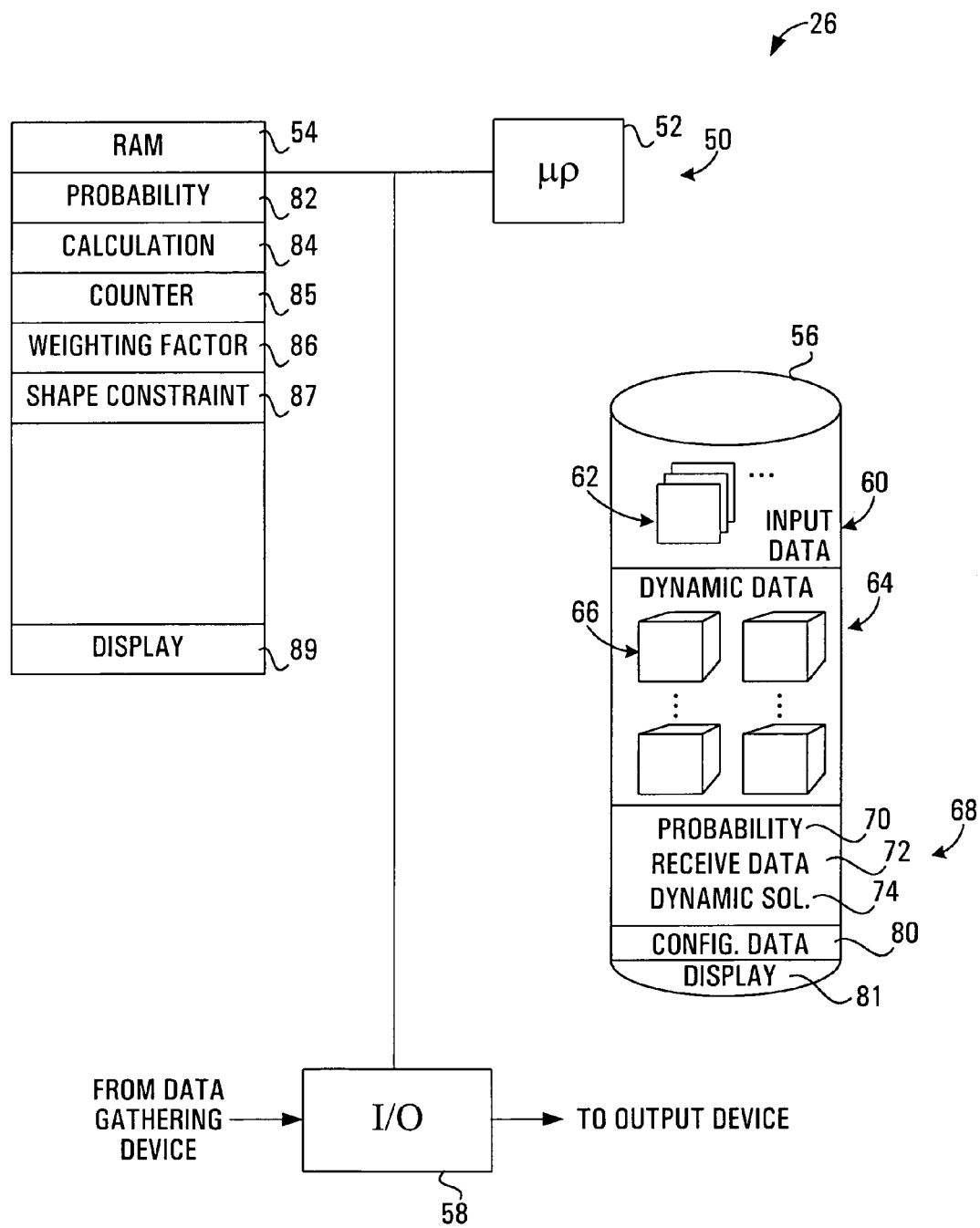
FIG. 3 is a block diagram of a programmable device of the system shown in FIG. 1.

Referring to FIG. 3, the programmable device is shown generally at 26. In this embodiment, the programmable device 26 is implemented in the desktop computer 34 shown in FIG. 1. The programmable device includes a processor 50, which in this embodiment includes a microprocessor 52 in communication with a random access memory (RAM) 54, a storage memory 56 and an input/output (I/O) port 58. In this specification, the terms "processor" or "processor circuit" are used to include any programmable device or any circuit or combination of circuits capable of performing the functions described herein. Alternatively, therefore, the processor 50 need not be implemented in a desktop computer, and may include a combination of one or more microprocessors, microcontrollers, other integrated circuits, or logic gate arrays, for example. Other such variations will be appreciated by one of ordinary skill in the art upon reading this specification and are not considered to depart from the scope of the present invention.

In this embodiment, the storage memory 56 includes a hard disk drive. Alternatively, however, it will be appreciated that any other type of memory may be substituted therefor. The storage memory 56 includes an input data store 60 for storing sets of data values produced by the tomographic imaging device in respective two-dimensional input data matrices. In this embodiment, there will be ninety two-dimensional input data matrices 62, each input data matrix representing a respective tomography scan image produced by the tomography imaging device 30 at a particular one of the ninety stops or positions of the imaging device relative to the object.

The storage memory further includes a dynamic data store 64, for storing ninety three-dimensional dynamic data matrices 66, each dynamic data matrix representing the radioactivity of the voxels 40 of the object 28 at a particular time at which a corresponding tomography scan image was produced, or in other words, a three dimensional radioactivity image of the object 28 at a particular time during the tomography scan.

The storage memory 56 also includes a routines area 68 for storing a probability routine 70, a receive data routine 72, and a dynamic solution routine 74.

The probability routine 70 directs the processor 50 to calculate probability coefficients representing probabilities that photons emitted from each voxel will arrive at a particular one of the bins 42 of the detector 38 at a particular time interval or detector position during the scan.

The receive data routine 72 directs the processor 50 to receive signals representing data, or more particularly, representing successive tomography scan images of the object 28, and to store the data in the input data store 60 in the storage memory 56.

The dynamic solution routine 74 directs the processor 50 to impose a shape constraint such as a linear inequality constraint to determine sets of dynamic data values from the input data, and to store such sets in matrices in the dynamic data store 64 in the storage memory 56.

It will be appreciated, however, that the storage memory 56 is merely one example of a computer readable medium for providing computer readable instructions for directing a programmable device to implement the methods disclosed herein. Alternatively, the instructions or routines may be stored on a compact disc or floppy diskette, or on a ROM or EEPROM chip, for example, or on any other computer readable medium. Similarly, alternative means of producing a computer data signal embodied in a carrier wave for directing a programmable device to implement the methods disclosed herein would be apparent to one of ordinary skill in the art upon reading this specification. Such variations are not considered to depart from the scope of the present invention.

The storage memory 56 further includes a configuration data store 80 for storing configuration data, such as the probability coefficients calculated by the processor 50 under the direction of the probability routine 70, for example, for future use and/or re-use.

The storage memory also includes a display store 81 for storing illumination matrices representing images of the object 28 at successive time intervals.

Referring to FIGS. 1 and 3, the I/O port 58 is in communication with the data gathering device 22, and acts as a receiver for receiving the sets of values produced by the data gathering device representing measurements of the measurable property across the object 28 at respective measurement times, each set being associated with a respective measurement time. More particularly, in this embodiment, data representing successive tomography scan images across the object 28 detected at a SPECT imaging device at respective measurement times are received at the I/O port 58. The I/O port 58 is also in communication with the display device 35, and acts as a transmitter for transmitting a time varying graphical representation or values representing the measurable property to the display device for displaying a representation of the property.

The RAM 54 includes a probability store 82, a calculation area 84, a counter register 85, a weighting factor store 86, a shape constraint store 87 and a display buffer 89. The probability store 82 is used to store a linear operator comprising probability coefficients calculated by the processor during execution of the probability routine 70. The calculation area 84 is used by the processor 50 under the direction of the dynamic solution routine 74, to solve for the dynamic data matrices 66 as described in greater detail below. The counter register 85 is used to store a counter value representing the number of the tomographic scan currently in progress. The weighting factor store is used to store a weighting factor calculated by the processor during execution of the dynamic solution routine 74, the weighting factor representing a variance of the input data stored in the input data store 60. The shape constraint store is used to store a shape constraint, such as a linear inequality constraint for example, to which the physical property of each voxel of the object is expected to conform throughout the duration of the tomographic scan. The display buffer 89 is used to store data corresponding to the contents of the dynamic data matrices 66 representing radioactivity images of the object 28 at successive times, for successive display of such images on the display device 35 shown in FIG. 1.

Probability Routine

Referring to FIGS. 2 and 3, the probability routine 70 shown in FIG. 3 includes blocks of codes which direct the processor 50 to calculate probability coefficients to determine the values of a linear operator $C_{ijk}$. In this embodiment, i,j and k denote the voxels 40, the bins 42 and the ninety stops along the arc 31 respectively ($1 \leq i \leq 27000$, $1 \leq j \leq 3300$ and $1 \leq k \leq 90$). Each of the values $C_{ijk}$ represents the probability that a gamma photon emitted from the $i^{th}$ voxel of the object 28 will arrive at the $j^{th}$ bin 42 of the detector 38 at time $t_k$, or in other words at the time when the tomographic imaging device 30 is at the $k^{th}$ stop of the ninety stops along the 180° circumferential arc 31 about the object 28. The probability coefficients $C_{ijk}$ are based primarily on the geometry of the tomographic imaging device 30 and its physical arrangement and orientation relative to the object 28. However, the probability coefficients may also include probabilistic effects such as gamma ray scattering, attenuation and collimator blurring.

The probability routine 70 may be or may include a conventional routine such as those which are known to those of ordinary skill in the art, and need not be described in further detail here. Alternatively, any routine capable of determining the probability coefficients may be substituted therefor.

The probability routine further directs the processor 50 to store the coefficients of the linear operator $C_{ijk}$ in the probability store 82 of the RAM 54. Optionally, if similar scans are to be performed again, the probability coefficients $C_{ijk}$ may also be stored in the configuration data store 80 in the storage memory 56, for future re-use.

Receive Data Routine

Figure 4:
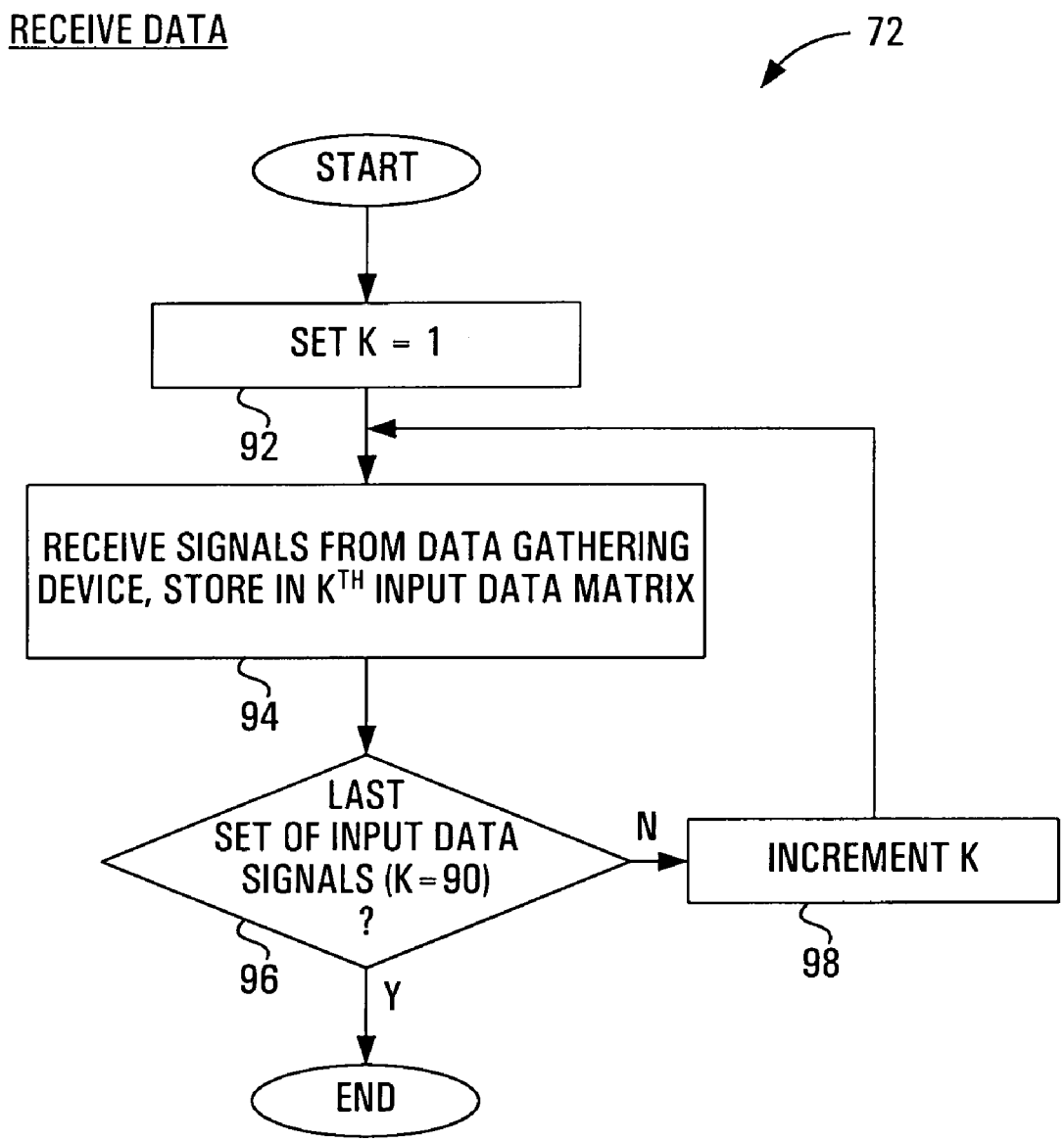
FIG. 4 is a flow chart of a receive data routine executed by the programmable device shown in FIG. 3.

Referring to FIGS. 3 and 4, the receive data routine is shown generally at 72 in FIG. 4. Generally, the receive data routine 72 includes blocks of codes which direct the processor 50 to receive a plurality of sets of values representing measurements of the property across the object 28 at respective measurement times, and to store the values in the storage memory 56. In this embodiment, the physical property of interest is radioactivity of the object 28 at respective times at which respective tomography scan images are produced by the tomographic imaging device 30.

The receive data routine begins with a first block of codes 92 which directs the microprocessor 52 to set a counter k=1 in the counter register 85 in the RAM 54, to correspond to the first time interval $t_k$ or in other words, the first position or stop of the tomographic imaging device 30 along the circumferential arc 31 during the tomography scan.

Block 94 then directs the microprocessor 52 to receive data signals representing a tomographic image, and to store data values representing the tomographic image in an input data matrix 62 in the input data store 60 of the storage memory 56.

Each input data matrix 62 has the same number of entries as the number of receptor bins 42 of the detector 38 of the tomographic imaging device. In this embodiment, therefore, each input data matrix 62 is a 50 row×66 column matrix, with each entry corresponding to a particular respective one of the 50×66 receptor bins 42. For numerical computational convenience, however, each of the 3300 receptor bins 42 is assigned a unique address number j where $1 \leq j \leq 3300$, and each respective corresponding location in the input matrix 62 is assigned an identical address number. Thus, in the remainder of this specification, when the $j^{th}$ bin or $j^{th}$ location of an input matrix is referred to, it will be understood that the bins and corresponding input matrix locations each have addresses numbered 1–66 along a top row, 67–132 along a second row, and so on, down to a bottom row of bins and corresponding input matrix locations numbered 3235–3300. For example, the location (32,57) of the input matrix 62 and the corresponding bin 42 located in the $32^{nd}$ row, $57^{th}$ column of the array of receptor bins are referred to as the $2103^{rd}$ (j=2103) input matrix location and the $2103^{rd}$ bin 42 respectively.

Thus, as data signals produced by the tomographic imaging device 30 are received at the I/O port 58, block 94 directs the microprocessor 52 to store data values representing the data signals in the $k^{th}$ input matrix 62, in a manner such that the data value stored in the $j^{th}$ location of the input matrix 62 represents the number of gamma ray counts detected at the corresponding $j^{th}$ receptor bin 42 during the $k^{th}$ time interval. For example, the data value stored in the $2103^{rd}$ location (i.e. row 32, column 57) of the $k^{th}$ input matrix 62 represents the number of gamma ray counts detected at the corresponding $2103^{rd}$ receptor bin 42 (i.e. the bin at the $32^{nd}$ row, $57^{th}$ column of the array of receptor bins 42 of the detector 38), during the $k^{th}$ time interval.

Block 96 then directs the microprocessor 52 to determine whether the tomography scan is complete. In this embodiment, ninety separate tomographic scan images corresponding to ninety different positions of the tomographic imaging device 30 along the arc 31 are produced, resulting in ninety corresponding input data matrices 62 in the input data store 60 of the storage memory 56. If all ninety such input data matrices have not yet been generated, block 98 directs the microprocessor 52 to increment the counter k in the RAM 54, and the microprocessor is directed back to block 94 to await receipt of the next set of signals representing the next tomographic scan image of the object. Processing continues in this manner until all ninety input data matrices have been generated, at which point the receive data routine is ended.

Dynamic Solution Routine

Figure 5:
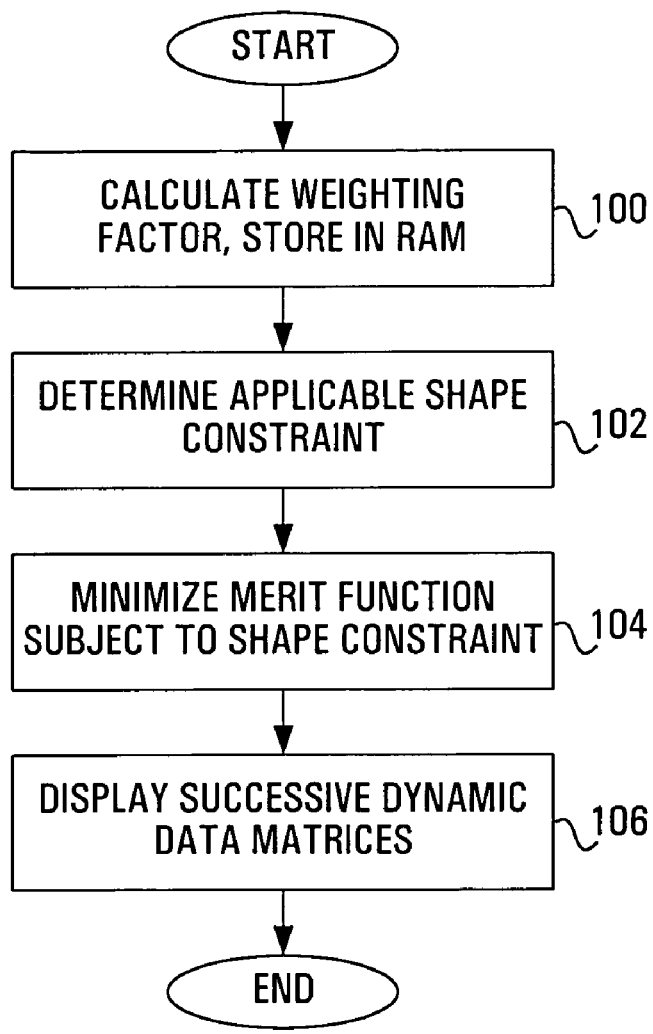
FIG. 5 is a flow chart of a dynamic solution routine executed by the programmable device shown in FIG. 3.

Referring to FIGS. 3 and 5, the dynamic solution routine is shown generally at 74. Generally, the dynamic solution routine 74 includes blocks of codes which program the processor 50 to produce a plurality of sets of values representing the measurable property at a plurality of locations throughout the object at the respective measurement times, by minimizing a figure of merit function relating the values representing the measurements with the values representing the property at the plurality of locations, with a shape constraint imposed on the values representing the property at the plurality of locations. The dynamic solution routine achieves this by directing the processor to perform calculations by imposing an inequality constraint to determine dynamic data values from the data stored in the input data matrices. Each dynamic data value represents a physical property (radioactivity) of the object at a respective corresponding one of the object's voxels 40 at a respective corresponding time interval k. More particularly, the dynamic solution routine determines the radioactivity x of each voxel i at each time interval k, denoted by $x_i(t_k)$ for k=(1 . . . 90).

In principle, ignoring noise, the problem of solving for $x_i(t_k)$ amounts to solving an equation of the form:

$$\sum_i C_{ijk} x_{ik} = d_{jk} \quad (1)$$

where $C_{ijk}$ is the linear operator comprising the probability coefficients, $x_{ik}$ denotes the dynamic data values $x_i(t_k)$ to be solved for and stored in the dynamic data matrices 66, and $d_{jk}$ denotes the tomographic scan data stored in the input matrices 62. In practice, however, perfect solutions to equation (1) cannot be found, and reliance upon approximation techniques, such as least squares methods for example, is necessary.

It will be appreciated that if the distribution of the radiopharmaceutical from voxel to voxel within the object were static, that is, constant over all ninety time intervals, then the radioactivity x of each voxel i would conform to the model $x_i(t_k)=A_i e^{-\lambda t_k}$ where $\lambda$ is the known decay constant of the radioisotope label. However, due to non-uniform flows of the radiopharmaceutical within the object, each voxel i may have its own unique decay profile. Accordingly, some researchers have previously forced the radioactivity function of each voxel i to conform to more complex models, such as the following biexponential model, for example:

$$x_i(t_k)=A_i e^{-\lambda_i t_k}+B_i e^{-\mu_i t_k}+C_i \quad (2)$$

where there are five unknowns for each voxel i, namely $A_i$, $\lambda_i$, $B_i$, $\mu_i$ and $C_i$.

It will be further appreciated that a non-linear least squares (NLS) method is an example of a prior art approximation method capable of deriving solutions of the form of equation (2). According to the NLS method, for each voxel i, the five parameters $A_i$, $\lambda_i$, $B_i$, $\mu_i$ and $C_i$ in equation (2) are solved by minimizing a figure-of-merit function ("merit function") of the following form:

Minimize $$\left\{\sum_{j,k} \sigma_{jk}^{-2}\left(\sum_i C_{ijk} x_i(t_k) - d_{jk}\right)^2\right\} \quad (3)$$

subject to:

$x_i(t_k)$ defined by the i basis functions of the form (2), i.e., $x_i(t_k)=A_i e^{-\lambda_i t_k}+B_i e^{-\mu_i t_k}+C_i$;

where:

$d_{jk}$ denotes the data value stored in the $j^{th}$ location of the $k^{th}$ input data matrix 62 corresponding to the $j^{th}$ receptor bin, representing the number of counts detected at receptor bin j during time interval k;

$C_{ijk}$ is the linear operator comprising the probability coefficients computed by the processor while executing the probability routine; and $\sigma^2_{jk}$ is a weighting factor, determined for example from the variance of the receptor bin contents $d_{jk}$ (generally based on a Poisson statistic).

However, a merit function of the form of equation (3) subject to the basis functions (2) is not necessarily unimodal. Accordingly, it is possible for some minimization algorithms to get "stuck" in the vicinity of local minima, and therefore fail to find the best fit corresponding to the global minimum. In addition, the computations required to minimize a merit function of the form (3) subject to basis functions of the form (2) are resource-intensive and time-consuming, often taking as long as one to two hours to solve with contemporary desktop computers. Moreover, the biexponential model which is imposed on the basis functions (2) and therefore on the solutions may not necessarily apply in all situations. Extensions of this model including more exponential terms may suffer from similar difficulties.

In contrast, according to the present invention, no assumption is made as to the precise form of the basis functions or the solutions $x_i(t_k)$. Rather, all that is assumed is a shape constraint, which in this embodiment takes the form of a linear inequality constraint. For example, in some circumstances it may reasonably be expected that the activity at any given voxel 40 of the object 28 will decrease over the course of the tomography scans. In such a case, the assumed shape constraint takes the form of the linear inequality constraint:

$$x_i(t_1) \geq x_i(t_2) \geq x_i(t_3) \ldots \geq x_i(t_{89}) \geq x_i(t_{90}) \quad (4)$$

Or, alternatively, in other situations only washin or uptake will occur during the course of the tomography scans, in which case it may be reasonable to assume that the shape constraint takes the form of the linear inequality constraint:

$$x_i(t_1) \leq x_i(t_2) \leq x_i(t_3) \ldots \leq x_i(t_{89}) \leq x_i(t_{90}) \quad (5)$$

Other similar shape constraints may be readily envisioned to apply to certain situations. For example, in some cases it may be desirable to assume that $x_i(t_k)$ increases then decreases representing washin followed by washout, in which case it might be assumed that the shape constraint takes the form of the linear inequality constraint:

$$x_i(t_1) \leq x_i(t_2) \ldots \leq x_i(t_{P_i-1}) \leq x_i(t_{P_i}) \geq x_i(t_{P_i+1}) \ldots \geq x_i(t_{89}) \geq x_i(t_{90}) \quad (6)$$

where position $P_i$ may vary from voxel to voxel.

In other cases it may be desirable to assume that $x_i(t_k)$ decreases then increases. Similarly, it may be desirable to assume that $x_i(t_k)$ increases or decreases in either a concave or convex manner, without assuming any precise functional form of $x_i(t_k)$. Further illustrative examples of shape constraints are provided in (8) below.

Thus, according to the present embodiment of the invention, a novel and inventive reconstruction method using Shape Constrained Least Squares (SCLS) analysis is provided. The solutions $x_i(t_k)$ are calculated by minimizing a merit function of the form (3) subject to a linear inequality constraint of the form (4), (5) or (6) for example, instead of minimizing the merit function subject to basis functions of the form (2).

More particularly, in this embodiment the dynamic solution routine 74 directs the processor 50 to solve the following equation:

Minimize $$\left\{\sum_{j,k} \sigma_{jk}^{-2}\left(\sum_i C_{ijk} x_{ik} - d_{jk}\right)^2 + R(x)\right\} \quad (7)$$

subject to:

$x_{ik}=x(t_k)$ are numerical values satisfying a shape constraint, such as one of the following exemplary shape constraints: (8)

$$x_{i_1} \geq x_{i_2} \geq x_{i_3} \ldots \geq x_{i_{89}} \geq x_{i_{90}} \geq 0 \quad \text{(decreasing)} \quad (8a)$$

$$0 \leq x_{i_1} \leq x_{i_2} \leq x_{i_3} \ldots \leq x_{i_{89}} \leq x_i t_{90} \quad \text{(increasing)} \quad (8b)$$

$$0 \leq x_{i1} \leq x_{i2} \cdots \leq x_{i,P_i-1} \leq \qquad (8c)$$
$$x_{i,P_i} \geq x_{i,P_i+1} \cdots \geq x_{i89} \geq x_{i90} \geq 0$$

(increasing to peak at $P_i$ then decreasing)

$$0 \leq x_{i1} \leq x_{i2} \cdots \leq x_{i,P_i-v_i} \text{ and } x_{i,P_i+v_i} \cdots \geq x_{i89} \geq x_{i90} \geq 0 \qquad (8d)$$

(increasing then decreasing with gap around peak $P_i$)

$$0 \geq x_{i1} - x_{i2} \geq x_{i2} - x_{i3} \geq \ldots \geq x_{i89} - x_{i90} \text{ and } x_{i1} \geq 0, \ldots \\ x_{i90} \geq 0 \text{ (convex)} \qquad (8e)$$

$$0 \leq x_{i1} - x_{i2} \leq x_{i2} - x_{i3} \leq \ldots \leq x_{i89} - x_{i90} \text{ and } x_{i1} \geq 0, \ldots \\ x_{i90} \geq 0 \text{ (concave)} \qquad (8f)$$

$$0 \geq x_{i1} - x_{i2} \geq x_{i2} - x_{i3} \geq \ldots \geq x_{iq_i} - x_{iq_i+1} \text{ and } x_{iq_i} - \\ x_{iq_i+1} \leq x_{iq_i+1} - x_{iq_i+2} \leq \ldots \leq x_{i89} - x_{i90} \text{ (convex-concave with inflection point at } q_i. \qquad (8g)$$

wherein:

R(x) is an optional regularizing term which may be omitted if desired, as discussed in greater detail below; and $d_{jk}$, $C_{ijk}$ and $\sigma^2_{jk}$ are defined as above in equation (3).

Thus, rather than imposing any pre-determined functional form such as a biexponential form upon the solutions $x_i(t_k)$, the present embodiment of the invention presumes nothing about the form of $x_i(t_k)$ and simply solves for $x_i(t_k) = x_{i1}, \ldots x_{i90}$ where each one of $x_{i1}$ to $x_{i90}$ is simply a numerical value representing the radioactivity at voxel i at measurement times $t_1$ to $t_{90}$ respectively.

It will be appreciated that minimizing the merit function (7) subject to a shape constraint such as those listed in (8) for example, presents an optimization problem where the inequality constraints are linear in the unknown variables $x_{ik} = x(t_k)$, representing the measurable property for each of the locations i throughout the object at the times k. Effectively, therefore, in this embodiment equation (8) defines 27,000 respective linear basis functions $x_i(t_k) = x_{i1} \ldots x_{i90}$, each linear basis function having ninety degrees of freedom.

Referring to FIGS. 3 and 5, the dynamic solution routine is shown generally at 74 in FIG. 5. The dynamic solution routine 74 includes a plurality of blocks of codes including a first block of codes 100, which directs the processor 50 to calculate the weighting factor $\sigma_j^{-2}$ referred to above in equations (3) and (7). Essentially, the weighting factor $\sigma_{jk}^{-2}$ represents a covariance matrix and is used to account for the expected measurement noise. Block 100 first directs the microprocessor 52 to read the contents $d_{jk}$ of the ninety input data matrices 62, each $k^{th}$ input data matrix containing 3300 values representing the number of gamma ray counts received at each $j^{th}$ one of the 3300 bins 42 during the $k^{th}$ one of the ninety time intervals. Block 100 then directs the microprocessor to calculate the values of the weighting factor $\sigma_{jk}^{-2}$ by determining a variance of the contents $d_{jk}$ of the input data matrices. More particularly, in this embodiment the values of the weighting factor $\sigma_{jk}^{-2}$ are determined from the Poisson statistics of the input data values $d_{jk}$. For example, the values of the weighting factor $\sigma_{jk}^{-2}$ may be calculated such that $\sigma_{jk}^2 = \max(d_{jk}, \epsilon)$ for a threshold value $\epsilon > 0$ to avoid exceedingly small values $\sigma_{jk}^2$ if the data $d_{jk}$ are approximately Poisson distributed. Other methods for producing the weighting factor would be apparent to one of ordinary skill in the art upon reading this specification, and such alternative methods are not considered to depart from the scope of the invention.

Block 100 further directs the microprocessor to store the weighting factor $\sigma_{jk}^{-2}$ in the weighting factor store 86 of the RAM 54. Optionally, if further analysis is to be repeated for the same input data, block 100 may further direct the processor to store the weighting factor in the configuration data area 80 of the storage memory 56.

The microprocessor 52 is then directed to block 102, which directs it to determine an appropriate shape constraint for the i solutions $x_i(t_k)$. In this embodiment, block 102 prompts a user of the programmable device 26 to enter the applicable shape constraint at the user input device 33 shown in FIG. 1. For example, in response to receiving user input of "DECREASING", the microprocessor determines that the linear inequality constraint (4) applies, and stores the constraint (4) in the shape constraint store 87 of the RAM 54. Alternatively, the microprocessor may be directed to read a pre-determined shape constraint previously stored in the configuration data area 80 of the storage memory and copy this stored constraint to the shape constraint store 87.

Block 104 then directs the microprocessor 52 to minimize the merit function (7) above, subject to the linear basis functions comprising shape constraints of the form (8) for example. To do this, the microprocessor 52 is directed to execute a math program, or more particularly a minimization subroutine (not shown) on the values representing the measurements, to minimize the sum of squares (7) of the difference between the product $\Sigma_i C_{ijk} x_{ik}$ of the linear operator and the values representing the property, and the values $d_{jk}$ representing the measurements of the property.

In this embodiment, the minimization subroutine may include a conventional Constrained Optimization subroutine. However, block 104 directs the microprocessor to execute the subroutine in an unconventional manner, by substituting linear basis functions comprising a shape constraint of the form (8) stored in the shape constraint store 87, for conventional basis functions which are normally used in such a minimization subroutine.

More particularly, in this embodiment a conventional bound constraint routine is modified to minimize equation (7) subject to shape constraints, such as linear inequality constraints. Such conventional bound constraint software may include an L-BFGS routine described in the publication by D. Liu and J. Nocedal, "On the Limited Memory BFGS Method for Large Scale Optimization", Math. Prog. B. 1989 at pp. 503–528, for example, or alternatively may include a GPCG routine by Rolf Felkel of the Numerical Analysis Group, Mathematical Department, Technical University Darmstadt, for example.

Generally, such conventional bound constraint software has been previously used to minimize nonlinear objective functions subject to bound constraints on the unknown variables $x_i$, that is, $l_i \leq x_i \leq u_i$ for given boundary values $l_i$, $u_i$.

According to the present embodiment of the invention, block 104 directs the microprocessor to perform a change of variables to effectively use such software to achieve minimization of equation (7) subject to shape constraints. For example, where the shape constraint stored in RAM is of the form (8a), (8b), (8c) or (8d), block 104 directs the microprocessor to perform the following change of variables:

set $$\begin{cases} x'_{ik} = x_{ik} - x_{ik+1} \\ x'_{i90} = x_{i90} \end{cases} \qquad (9)$$

Similarly, where the shape constraint stored in the RAM is of the form (8e), (8f) or (8g), block 104 directs the microprocessor to perform the following change of variables:

set $$x''_{ik} = x'_{ik} - x'_{ik+1} = x_{ik} - 2x_{ik+1} + x_{ik+2}. \tag{10}$$

It will be appreciated that the changes of variables (9) or (10) serve to transform the shape constraints on $x_{ik}$ of the form (8a)–(8d) or (8e)–(8f) into bound constraints on $x'_{ik}$ or $x''_{ik}$ respectively. Alternatively, other transformations of other types of shape constraints will be apparent to those of ordinary skill in the art upon reading this specification and are not considered to depart from the scope of the invention.

The shape constraint previously stored in RAM at block 102 is effectively pre-specified to the math program or minimization routine invoked at block 104. Thus, block 104 directs the microprocessor to read the pre-specified shape constraint, transform the shape constraint into a bound constraint according to (9) or (10) or other transformations, to execute the conventional bound constraint minimization routine subject to the change in variables, then to transform back to $x_{ik}$, to effectively minimize equation (7) subject to the pre-specified shape constraint.

Optionally, block 104 may direct the processor to stabilize the minimization problem by adding various regularizing terms to the quadratic objective in equation (7). This would entail minimizing equation (7) wherein at least some of the regularizing terms $R(x)$ are non-zero. Examples of preferable regularization terms include the following:

$$R(x) = \sum_{ik} w_{ik}((x_{ik} - x_{i^a_k})^2 + (x_{ik} - x_{i^b_k})^2 + (x_{ik} - x_{i^c_k})^2) \tag{11a}$$

wherein $R(x)$ is a Tychonoff type (weighted spatial gradient) regularizer, and wherein $i^a$, $i^b$ and $i^c$ are voxels adjacent to voxel i, such as an upper neighbour, a right hand neighbour and a forward neighbour, for example;

$$R(x) = \sum_{ik} w_{ik}(x_{ik+1} - x_{ik})^2 \tag{11b}$$

wherein $R(x)$ is a Tychonoff type (weighted gradient in time) regularizer;

$$R(x) = \sum_k \sum_i w_i \hat{x}_{ik}^2 \tag{11c}$$

wherein $R(x)$ is a Fourier domain type (spatial Fourier high pass filter) regularizer, using the spatial Fourier transform of each of the image frames; the weights $w_i$ are close to zero for low spatial frequencies i and close to 1 for high spatial frequencies i;

$$R(x) = \sum_i \sum_k w_k \hat{x}_{ik}^2 \tag{11d}$$

wherein $R(x)$ is a Fourier domain type (temporal Fourier high pass filter) regularizer, using the temporal 1D Fourier transform for each of the time series $x_{i1} \ldots x_{i90}$ belonging to voxel i; the weights $w_k$ are close to zero for low temporal frequencies k and close to 1 for high temporal frequencies k; or $$R(x) = \sum_i \left(\sum_k \log\left(\frac{x_{ik+1} x_{ik-1}}{x_{ik}^2}\right)\right)^2 \tag{11e}$$

wherein $R(x)$ is a Physically motivated (constant flow rate) regularizer which gives preference to time profiles $x_{i1} \ldots x_{i90}$ exhibiting a constant flow rate of the form $Ae^{-\lambda t}$, and therefore penalizes irregular flow profiles; this regularizer acts in the temporal domain on each pixel separately.

Although regularizing terms may be omitted entirely if desired, it has been found that streaking artifacts, which may otherwise arise in images corresponding to early reconstruction times, tend to subside upon incorporation of such regularization. The Tychonoff and Fourier regularization methods have been found to provide slightly better numerical performance than the physically motivated method.

The microprocessor thus combines minimization and regularization to produce, for each voxel i of the voxels 40 of the object 28, a solution of the form (8) described above.

Block 104 further directs the microprocessor 52 to store the solutions $x_i(t_k)$ in corresponding locations in the dynamic data store 64 in the storage memory 56. As noted above, in this embodiment the dynamic data store 64 contains ninety dynamic data matrices 66, each matrix corresponding to a particular time interval k at which a corresponding tomographic image was produced. More particularly, in this embodiment, each of the dynamic data matrices 66 in the dynamic data store is a 30×30×30 three-dimensional matrix for storing 27,000 dynamic data values, each of the data values corresponding to a particular one of the 27,000 voxels 40 of the object 28 shown in FIG. 2. Thus, for each voxel i, the microprocessor produces ninety dynamic data values $x_{ik}$ for times $t_k=(t_1 \ldots t_{90})$. The microprocessor first stores $x_{i1}$ in the $i^{th}$ location of the first dynamic data matrix, then stores $x_{i2}$ in the $i^{th}$ location of the second dynamic data matrix, and so on, until all ninety of the values $x_{ik}$ corresponding to the $i^{th}$ voxel have been stored in respective dynamic data matrices. The microprocessor continues in this manner until ninety such values have been stored in the dynamic data matrices representing the number of counts at each of the 27,000 voxels i at each of the ninety time intervals k.

It will be appreciated that because the present invention need not be implemented in a desktop computer, the particular format of the signals produced by the processor 50 at block 104 is unimportant. Generally, any alternative type of signal representing the plurality of sets of values representing the property at the plurality of locations throughout the object is not considered to depart from the scope of the present invention, provided the signal is produced according to the inventive methods disclosed herein or equivalents thereof.

The processor is then directed to block 106, which directs the microprocessor to produce a time-varying graphical representation of the object 28, to represent a change of the measurable property over time. The processor is then directed to use the representation to control the display device to display the representation, or more particularly, to produce successive images representing the property at successive instants in time, in response to the representation of the property. This is effectively achieved by successively displaying representations of the respective dynamic data matrices 66.

It will be appreciated that a number of display options are available. In the present embodiment, the microprocessor is directed to produce a two- or three-dimensional projectional representation of the three-dimensional object 28 and to display the projectional representation on the display device 35. Block 106 directs the microprocessor to execute a projectional display subroutine (not shown) to produce k two-dimensional illumination matrices, such that each value in each illumination matrix represents an intensity of illumination of a corresponding pixel on the display.

Each of the k illumination matrices represents a view at a successive time frame of the object 28, possibly from a different successive spatial point of view, so that a successive display of the contents of the k illumination matrices is akin to viewing a short movie of the 3D object in which the camera slowly moves from a first point of view to a second point of view. To achieve this, block 106 directs the microprocessor to produce each of the k illumination matrices to represent a projection of the corresponding three-dimensional dynamic data matrix onto a hypothetical two-dimensional array, with the hypothetical two-dimensional array incrementally moving along a radial arc about the three-dimensional dynamic data matrix, analogously to the motion of the tomographic imaging device about the object, so that each successive illumination matrix represents a view of the object from an incrementally different point of view than the previous view. The "views" represent snapshots of the dynamic object at successive time increments.

Figure 6:
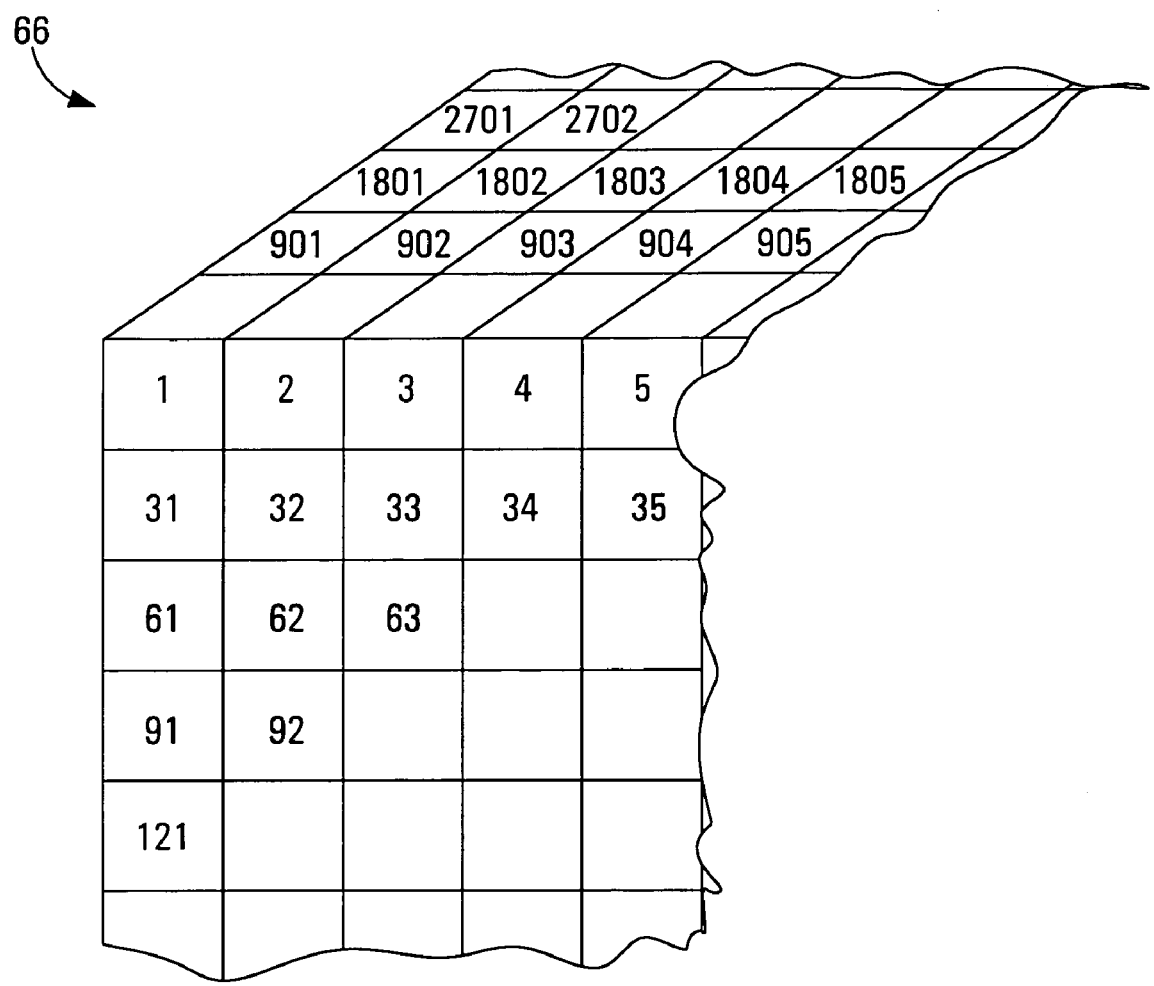
FIG. 6 is a schematic representation of a dynamic data matrix produced by the programmable device shown in FIG. 3.

For example, referring to FIG. 6, a schematic representation of a dynamic data matrix is shown generally at 66. Each of the locations in the dynamic data matrix has an identifying number i, $1 \leq i \leq 27{,}000$, uniquely corresponding to a particular one of the 27,000 voxels 40 of the object 28 shown in FIG. 2. It will be appreciated, for example, that in one possible view at time k=1, voxel numbers 1 to 30 of the $30^3$ voxels 40 might be along a line normal to the hypothetical two-dimensional array, and accordingly, their values would be projected into the same location of the $1^{st}$ illumination matrix, so that a single illumination value in the $1^{st}$ illumination matrix corresponding to a single pixel would represent the summed radioactivity of voxels 1 to 30, or in other words $$\sum_{i=1}^{30} x_{ij}.$$

However, in another possible view at time k=46, for example, voxel numbers 1, 901, 1801, 2701, . . . 26101 might now be along the line normal to the hypothetical two-dimensional array, in which case a single illumination value in the $46^{th}$ illumination matrix corresponding to a single display pixel would contain the summed value $$\sum_{i=1}^{30} x_{(1+900(i-1)),46}$$

representing the projection of the radioactivity of voxels along the normal line.

Referring back to FIGS. 3 and 5, block 106 further directs the microprocessor 52 to normalize the illumination matrices, if necessary to adjust for the range of pixel illumination available on the display device 35, and to store the illumination matrices in the display buffer 89 in the RAM 54. In addition, the microprocessor is directed to store the illumination matrices in the display store 81 of the storage memory 56. Once all of the illumination matrices have been produced and stored in this manner, block 106 directs the microprocessor to successively display the illumination matrices, to effectively produce a visual representation of the object in response to the plurality of sets of values representing radioactivity. The visual representation includes a movie representing the radioactivity of the voxels 40 of the object 28 over the ninety time intervals.

The foregoing projectional display method is merely one example of a way in which the processor may be programmed to produce the successive images to depict a three dimensional representation of the property in the object which varies according to changes in the property over time. Alternatively, other ways of producing a visual representation of the object in response to a time varying graphical representation produced by the processor may be apparent to one of ordinary skill in the art upon reading this specification. For example, different display colours may represent different intensities of radioactivity at corresponding voxels of the object. Or, as a further example, radioactive local regions may be displayed in a manner such that the size of the local region is exaggerated proportionally to the radioactivity of the region. Alternatively, the contents of the dynamic data matrices may be used to generate true three-dimensional images comprising left and right perspective views, preferably from a gradually shifting point of view, and the display device 35 shown in FIG. 1 may be modified to provide for synchronized viewing glasses to enable three-dimensional viewing, for example. A 2-D slice of the object may be displayed, or a 3D dynamic movie may be displayed by showing iso-surfaces of the 3D object at each time, possibly from spatially shifting points of view. Or, volume rendering may be used to display transparent 3D objects. Alternatively, it may be desirable to observe the time profiles for one or more individual voxels, displayed as static graphical curves, for example. More generally, the representation produced at block 106 is not limited to a display and may include other forms of representations. For example, the representation may include any form of kinetic modelling. Other similar variations will be apparent to one of ordinary skill in the art upon reading this specification, and are not considered to depart from the scope of the invention.

Generally, it has been found that the foregoing reconstruction method of Shape Constrained Least Squares (SCLS) analysis provides numerous advantages over the prior art. Generally, the singular value distribution of the matrices $\sigma_{jk}^{-2} C_{ijk}$ encountered in many practical situations allows for the constrained optimization subroutine to achieve fast convergence. Thus, in contrast with conventional Nonlinear Least Squares methods or the Factor Analysis of Dynamic Structures method which often require one to two hours or more of processing time, embodiments of the present invention often solve for the dynamic data $x_i(t_k)$ for all voxels i over all time intervals k within ten minutes, for example.

In addition, since no assumption is made as to the precise functional form of the solutions $x_i(t_k)$, the present invention does not sacrifice experimental accuracy by attempting to force the data to conform to a biexponential or other standard model.

For each voxel i, the inventive SCLS reconstruction method described herein effectively allows for an activity profile with a much larger number of degrees of freedom, such as ninety degrees of freedom where the object is scanned at ninety successive time intervals, for example. Although conventional wisdom suggests that increasing the degrees of freedom generally increases the risk of producing an under-fitted model, experiments have generally confirmed that the SCLS method disclosed herein works well and amounts to a significant improvement over existing NLS, FADS or fast rotation methods.

Alternatives:

Other Minimization Routines:

Embodiments of the present invention may employ constrained minimization routines other than constrained least squares.

For example, referring back to FIGS. 3 and 5, in a second embodiment of the invention the dynamic solution routine 74 shown in FIG. 3 may include a Maximum Likelihood (ML) minimization subroutine. Block 104 in FIG. 5 may be modified to direct the processor 50 to solve an equation of the following form:
Minimize $$\left\{ \phi(x) = \sum_{j=1}^{3300} \sum_{k=1}^{90} \left( \sum_{i=1}^{27000} C_{ijk} x_{ik} - d_{jk} \log \left( \sum_{i=1}^{27000} C_{ijk} x_{ik} \right) \right) \right\} \quad (12)$$

subject to:
$x_{ik} = x_i(t_k)$ being defined as a linear basis function of the shape-constrained form (8).

Block 104 may further be modified to combine the maximum likelihood minimization subroutine with regularization, as previously described.

Similarly, it will be appreciated that according to a third embodiment of the invention, the dynamic solution routine 74 shown in FIG. 3 may include an Expectation Maximization (EM) subroutine, which may include an OS-EM or Bayesian EM routine, for example. Block 104 in FIG. 5 may be modified to direct the processor 50 to execute the EM subroutine, preferably with regularization as described above, to solve equations analogous to equation (7) subject to (8) above, which may be easily derived by one of ordinary skill in the art upon reading this specification.

Linear Difference Method

According to a fourth embodiment of the invention, prior information about the unknown tracer dynamics in the body may be used, if available. As most physiological models may be represented by compartmental models, it may be desirable to include such a model in a given situation. For example, if the dynamic to be visualized is known to be accurately represented by a two compartment model, a biexponential function of the form (2) may be correct. Rather than imposing the biexponential functional form, the present embodiment of the invention seeks reconstructions which are close to satisfying a difference equation of the following form:

$$x_{i,k+1} = \alpha_i x_{i,k-1} + \beta_i x_{ik} + \gamma_i \quad (14)$$

It will be appreciated that a set of values $x_{ik} = x_i(t_k)$ satisfying equation (2) will also satisfy a difference equation of the form (14).

Thus, referring back to FIGS. 3 and 5, in this embodiment, block 104 of the dynamic solution routine 74 is modified to direct the processor 50 to solve the following equation:
Minimize:

$$F(x, \alpha, \beta, \gamma) = \sum_{j,k} w_{jk} \left( \sum_i C_{ijk} x_{ik} - d_{jk} \right)^2 + \quad (15)$$
$$K \sum_i \sum_k (x_{i,k+1} - \alpha_i x_{i,k-1} - \beta_i x_{i,k} - \gamma_i)^2 + R(x)$$

subject to:
$x_{ik} = x_i(t_k)$ satisfying shape constraints of the form (8);
where R(x) comprises regularizing terms, such as those described above, for example; and
K is a penalty parameter.

The processor 50 is directed to minimize the merit function $F(x,\alpha,\beta,\gamma)$ with respect to the variables $(x,\alpha,\beta,\gamma)$ simultaneously.

Modified block 104 first directs the processor to begin by setting an iteration value n=0 and a first penalty parameter K=0 in the calculation area of the RAM 54, and to obtain an estimate for $x_{i,k}$. The processor is then directed to use the estimate for $x_{i,k}$ to estimate the three parameters $\alpha_i$, $\beta_i$ and $\gamma_i$ for each voxel i. Modified block 104 then directs the processor to select a new incremented iteration value n>0, and a new penalty parameter K and to repeat the above estimation procedure using the previous estimates to obtain an improved estimate of $x_{i,k}$. Block 104 directs the processor to continue incrementing the iteration value n and adjusting the penalty parameter K to obtain successively improving estimates of $x_{i,k}$. In practice, only a few iterations, usually of the order of five to ten iterations, are required for the successive estimates of $x_{i,k}$ to converge. Thus, in this embodiment, block 104 directs the processor to perform ten iterations. Generally, the choice of each successive penalty parameter K for each iteration is heuristic, and must be "tuned" to the particular application, by trial and error. Successive penalty parameters are non-decreasing, and are subject to the constraints that if the penalty parameter is too large the iteration will fail, but if it is too small the penalty parameter will have no influence on the iteration. In this embodiment, block 104 directs the processor to select the ten successive penalty parameters as K={0, 2, 5, 10, 15, 20, 20, 20, 20 and 20} for the ten iterations respectively. However, other suitable choices may be apparent to those of ordinary skill in the art upon reading this specification.

Alternatively, rather than performing a fixed number of iterations, block 104 may be modified to compare a given estimate for $x_{i,k}$ to a previous estimate and cease iterating when the difference falls below a pre-defined threshold, indicating substantial convergence. It has been found that the converged estimates for $x_{i,k}$ generally agree well with biexponential results produced by solving equation (3) subject to (2).

Although the measurable property included radioactivity in the foregoing embodiments, it will be appreciated that the embodiments of the present invention may be applied to other measurable properties in other contexts.

While specific embodiments of the invention have been described and illustrated, such embodiments should be considered illustrative of the invention only and not as limiting the invention as construed in accordance with the accompanying claims.

What is claimed is:

1. A method of using a processor to analyze data signals representing tomography scan images of an organic object, the method comprising:
   a) receiving data representing successive tomography scan images of said object;
   b) performing calculations by imposing an inequality constraint to determine dynamic data values from said data, each of said dynamic data values representing a physical property of said object at a respective corresponding one of a plurality of voxels of said object at a respective corresponding time; and
   c) producing a representation of said dynamic data values, representing said physical property at said voxels at said times.

2. A method as claimed in claim 1 wherein performing said calculations includes minimizing a figure of merit function subject to said inequality constraint.

3. A method as claimed in claim 2 wherein performing said calculations includes minimizing said figure of merit function subject to linear basis functions constrained by a linear inequality constraint selected from the following group wherein N represents the number of said respective times:
   a) $x_{i_1} \geq x_{i_2} \geq x_{i_3} \ldots \geq x_{i,N-1} \geq x_{i,N} \geq 0$;
   b) $0 \leq x_{i_1} \leq x_{i_2} \leq x_{i_3} \ldots \leq x_{i,N-1} \leq x_{i,N}$;

c) $0 \leq x_{i1} \leq x_{i2} \cdots \leq x_{i,P_i-1} \leq$
   $x_{i,P_i} \geq x_{i,P_i+1} \cdots \geq x_{i,N-1} \geq x_{i,N} \geq 0$;

d) $0 \leq x_{i1} \leq x_{i2} \cdots \leq x_{i,P_i-v_i}$ and $x_{i,P_i+v_i} \cdots \geq x_{i,N-1} \geq x_{i,N} \geq 0$;

e) $0 \geq x_{i1}-x_{i2} \geq x_{i2}-x_{i3} \geq \ldots x_{i,N-1}-x_{i,N}$ and $x_{i1} \geq 0, \ldots x_{iN} \geq 0$; and
   f) $0 \leq x_{i1}-x_{i2} \leq x_{i2}-x_{i3} \leq \ldots x_{i,N-1}-x_{i,N}$ and $x_{i1} \geq 0, \ldots x_{iN} \geq 0$; and
   g) $0 \geq x_{i1}-x_{i2} \geq x_{i2}-x_{i3} \geq \ldots \geq x_{iq_i}-x_{iq_i+1}$ and $x_{iq_i}-x_{iq_i+1} \leq x_{iq_i+1}-x_{iq_i+2} \leq \ldots \leq x_{i,N-1}-x_{iN}$.

4. A method as claimed in claim 1 wherein receiving data includes receiving data representing successive images detected at a Single Photon Emission Computed Tomography (SPECT) imaging device.

5. A computer-implemented method of producing a representation of a measurable property which varies in time and space, the method comprising:
   a) receiving a plurality of sets of values representing measurements of said property across an object at respective measurement times, each set being associated with a respective measurement time; and
   b) producing a plurality of sets of values representing said property at a plurality of locations throughout said object at said respective measurement times, by minimizing a figure of merit function relating said values representing said measurements with said values representing said property at said plurality of locations, with a shape constraint imposed on said values representing said property at said plurality of locations.

6. The method claimed in claim 5, wherein minimizing said figure of merit function further comprises solving for numerical values describing said property for each of said locations throughout said object, said numerical values being constrained by said shape constraint.

7. The method claimed in claim 5, wherein minimizing said figure of merit function further comprises solving for linear basis functions describing said property for each of said locations throughout said object, said linear basis functions being constrained by said shape constraint.

8. The method claimed in claim 5, wherein minimizing said figure of merit function further comprises minimizing a sum of squares of a difference between a product of a linear operator and said values representing said property, and said values representing said measurements.

9. The method claimed in claim 8, wherein minimizing said figure of merit further comprises solving the following equation:
   a) Minimize $$\left\{ \sum_{j,k} \sigma_{jk}^{-2} \left( \sum_i C_{ijk} x_i(t_k) - d_{jk} \right)^2 + R(x) \right\},$$

wherein:
   b) $d_{jk}$ comprises said plurality of sets of values representing said measurements $d_j$ of said property across an object at respective measurement times $t_k$;
   c) $x_i(t_k)$ comprises said plurality of sets of values representing said property x at a plurality of locations i throughout said object at said respective measurement times $t_k$;
   d) $x_i(t_k)=x_{ik}$ are numerical values subject to said shape constraint comprising a linear inequality constraint selected from the following set of constraints, wherein N represents the number of said measurement times:
   i) $x_{i_1} \geq x_{i_2} \geq x_{i_3} \ldots \geq x_{i,N-1} \geq x_{i,N} \geq 0$;
   ii) $0 \leq x_{i_1} \leq x_{i_2} \leq x_{i_3} \ldots \leq x_{i,N-1} \leq x_{iN}$;

iii) $0 \leq x_{i1} \leq x_{i2} \cdots \leq x_{i,P_i-1} \leq$
   $x_{i,P_i} \geq x_{i,P_i+1} \cdots \geq x_{i,N-1} \geq x_{i,N} \geq 0$;

iv) $0 \leq x_{i1} \leq x_{i2} \cdots \leq$
   $x_{i,P_i-v_i}$ and $x_{i,P_i+v_i} \cdots \geq x_{i,N-1} \geq x_{i,N} \geq 0$;

v) $0 \geq x_{i1}-x_{i2} \geq x_{i2}-x_{i3} \geq \ldots \geq x_{i,N-1}-x_{i,N}$ and $x_{i1} \geq 0, \ldots x_{iN} \geq 0$;
   vi) $0 \leq x_{i1}-x_{i2} \leq x_{i2}-x_{i3} \leq \ldots \leq x_{i,N-1}-x_{i,N}$ and $x_{i1} \geq 0, \ldots x_{iN} \geq 0$; and
   vii) $0 \geq x_{i1}-x_{i2} \geq x_{i2}-x_{i3} \geq \ldots \geq x_{iq_i}-x_{iq_i+1}$ and $x_{iq_i}-x_{iq_i+1} \leq x_{iq_i+1}-x_{iq_i+2} \leq \ldots \leq x_{i,N-1}-x_{iN}$
   e) $C_{ijk}$ and $\sigma^2_{jk}$ are weighting factors; and
   f) R(x) is a regularizing term.

10. The method claimed in claim 5, wherein minimizing a figure of merit function includes executing a math program on said values representing said measurements, said shape constraint being pre-specified to said math program.

11. The method claimed in claim 5, further comprising producing a graphical representation of said object, for controlling a display device.

12. The method claimed in claim 11, further comprising producing a time varying graphical representation of said object to represent a change of said property over time.

13. The method claimed in claim 11, further comprising transmitting said graphical representation to a display device for displaying a representation of said property.

14. The method claimed in claim 13, further comprising displaying said representation of said property.

15. The method claimed in claim 14, further comprising producing successive images representing said property at successive instants in time, in response to said representation of said property.

16. The method claimed in claim 15, further comprising producing said successive images to depict a three dimensional representation of said property in said object which varies according to changes in said property over time.

17. The method claimed in claim 5, further comprising producing said sets of values representing measurements of said property across said object at respective measurement times.

18. The method claimed in claim 17, wherein producing comprises measuring radioactivity across said object.

19. The method claimed in claim 18, wherein measuring radioactivity includes operating a Single Photon Emission Computed Tomography (SPECT) imaging device.

20. A signal produced by the method of claim 5, said signal representing said plurality of sets of values representing said property at a plurality of locations throughout said object.

21. An apparatus for producing a representation of a measurable property which varies in time and space, the apparatus comprising:
  a) a receiver for receiving a plurality of sets of values representing measurements of said property across said object at respective measurement times, each set being associated with a respective measurement time; and
  b) a processor circuit in communication with said receiver, said processor circuit being programmed to produce a plurality of sets of values representing said property at a plurality of locations throughout said object at said respective measurement times, by minimizing a figure of merit function relating said values representing said measurements with said values representing said property at said plurality of locations, with a shape constraint imposed on said values representing said property at said plurality of locations.

22. The apparatus claimed in claim 21, wherein said processor circuit is programmed to solve for linear basis functions describing said property for each of said locations throughout said object, said linear basis functions being constrained by said shape constraint.

23. The apparatus claimed in claim 21, wherein said processor circuit is programmed to minimize a sum of squares of a difference between a product of a linear operator and said values representing said property, and said values representing measurements of said property.

24. The apparatus claimed in claim 23, wherein said processor circuit is programmed to solve the following equation:
  a) Minimize $$\left\{ \sum_{j,k} \sigma_{jk}^{-2} \left( \sum_i C_{ijk} x_i(t_k) - d_{jk} \right)^2 + R(x) \right\},$$

wherein:
  b) $d_{jk}$ comprises said plurality of sets of values representing said measurements $d_j$ of said property across an object at respective measurement times $t_k$;
  c) $x_i(t_k)$ comprises said plurality of sets of values representing said property $x$ at a plurality of locations i throughout said object at said respective measurement times $t_k$;
  d) $x_i(t_k)=x_{ik}$ are numerical values subject to said shape constraint comprising a linear inequality constraint selected from the following set of constraints, wherein N represents the number of said measurement times:
  i) $x_{i_1} \geq x_{i_2} \geq x_{i_3} \ldots \geq x_{i_{N-1}} \geq x_{i_N} \geq 0$;
  ii) $0 \leq x_{i_1} \leq x_{i_2} \leq x_{i_3} \ldots \leq x_{i_{N-1}} \leq x_{i_N}$;

iii) $0 \leq x_{i1} \leq x_{i2} \cdots \leq x_{i,P_i-1} \leq$
    $x_{i,P_i} \geq x_{i,P_i+1} \cdots \geq x_{i,N-1} \geq x_{i,N} \geq 0$;

iv) $0 \leq x_{i1} \leq x_{i2} \cdots \leq$
    $x_{i,P_i-v_i}$ and $x_{i,P_i+v_i} \cdots \geq x_{i,N-1} \geq x_{i,N} \geq 0$;

v) $0 \geq x_{i1}-x_{i2} \geq x_{i2}-x_{i3} \geq \ldots \geq x_{i,N-1}-x_{i,N}$ and $x_{i1} \geq 0, \ldots x_{iN} \geq 0$;
  vi) $0 \leq x_{i1}x_{i2} \leq x_{i2}-x_{i3} \leq \ldots \leq x_{i,N-1}-x_{i,N}$ and $x_{i1} \geq 0, \ldots \geq x_{iN} \geq 0$; and
  vii) $0 \geq x_{i1}x_{i2} \geq x_{i2}-x_{i3} \geq \ldots \geq x_{iq_i}-x_{iq_i+1}$ and $x_{iq_i}-x_{iq_i+1} \leq x_{iq_i+1}-x_{iq_i+2} \leq \ldots \leq x_{i,N-1}-x_{iN}$
  e) $C_{ijk}$ and $\sigma^2_{jk}$ are weighting factors; and
  f) $R(x)$ is a regularizing term.

25. The apparatus claimed in claim 21, wherein said processor circuit is programmed to produce a graphical representation of said object, for controlling a display device.

26. The apparatus claimed in claim 25, wherein said processor circuit is programmed to produce a time varying graphical representation of said object to represent a change of said property over time.

27. The apparatus claimed in claim 26, further comprising a transmitter for transmitting said graphical representation to a display device for displaying a representation of said property.

28. The apparatus as claimed in claim 21, further comprising a transmitter for transmitting said values representing said property to a display device for displaying a representation of said property.

29. The apparatus claimed in claim 28, further comprising a display for displaying said representation of said property.

30. The apparatus claimed in claim 29, wherein said processor circuit is programmed to produce successive images representing said property at successive instants in time, in response to said representation of said property.

31. The apparatus claimed in claim 30, wherein said processor circuit is programmed to produce said successive images to depict a three dimensional representation of said property in said object which varies according to changes in said property over time.

32. The apparatus claimed in claim 21, further comprising a device for producing said sets of values representing measurements of said property across said object at respective measurement times.

33. The apparatus claimed in claim 32, wherein said device comprises a radioactivity measurement device for measuring radioactivity across said object.

34. The apparatus claimed in claim 33, wherein said device includes a tomography scanner.

35. The apparatus as claimed in claim 33, wherein said radioactivity measurement device comprises a Single Photon Emission Computed Tomography (SPECT) imaging device.

36. An apparatus for producing a representation of a measurable property which varies in time and space, the apparatus comprising:

a) means for receiving a plurality of sets of values representing measurements of said property across said object at respective measurement times, each set being associated with a respective measurement time; and b) means for producing a plurality of sets of values representing said property at a plurality of locations throughout said object at said respective measurement times, by minimizing a figure of merit function relating said values representing measurements with said values representing said property at a plurality of locations, with a shape constraint imposed on said values representing said property at a plurality of locations.

37. A computer readable medium for providing computer readable instructions for directing a programmable device to implement a method of producing a representation of a measurable property which varies in time and space by:

a) receiving a plurality of sets of values representing measurements of said property across said object at respective measurement times, each set being associated with a respective measurement time; and b) producing a plurality of sets of values representing said property at a plurality of locations throughout said object at said respective measurement times, by minimizing a figure of merit function relating said values representing measurements with said values representing said property at a plurality of locations, with a shape constraint imposed on said values representing said property at a plurality of locations.

38. A computer data signal embodied in a carrier wave for directing a programmable device to implement a method of producing a representation of a measurable property which varies in time and space, said data signal comprising:

a) a code segment for directing a programmable device to receive a plurality of sets of values representing measurements of said property across said object at respective measurement times, each set being associated with a respective measurement time; and b) a code segment for directing a programmable device to produce a plurality of sets of values representing said property at a plurality of locations throughout said object at said respective measurement times, by minimizing a figure of merit function relating said values representing measurements with said values representing said property at a plurality of locations, with a shape constraint imposed on said values representing said property at a plurality of locations.

39. A method of producing an image representing changes of radioactivity in an object, the method comprising;

a) receiving a plurality of sets of values representing tomography scan images across said object at respective measurement times, each set being associated with a respective measurement time;

b) producing a plurality of sets of values representing radioactivity at a plurality of locations throughout said object at said respective measurement times, by minimizing a figure of merit function relating said values representing said tomography scan images with said values representing radioactivity, with a shape constraint imposed on said values representing radioactivity; and c) producing a visual representation of said object in response to said plurality of sets of values representing radioactivity, said visual representation including a representation of radioactivity over time.

40. An apparatus for producing an image representing changes of radioactivity in an object, the apparatus comprising;

a) a receiver for receiving a plurality of sets of values representing tomography scan images across said object at respective measurement times, each set being associated with a respective measurement time;

b) a processor circuit programmed to produce a plurality of sets of values representing radioactivity at a plurality of locations throughout said object at said respective measurement times, by minimizing a figure of merit function relating said values representing said tomography scan images with said values representing radioactivity, with a shape constraint imposed on said values representing radioactivity; and programmed to produce a time varying graphical representation of said object in response to said plurality of sets of values representing radioactivity; and c) a display responsive to said graphical representation for producing a visual representation of said object in response to said graphical representation.

* * * * *

UNITED STATES PATENT AND TRADEMARK OFFICE
CERTIFICATE OF CORRECTION

PATENT NO. : 7,103,204 B1
APPLICATION NO. : 09/435458
DATED : September 5, 2006
INVENTOR(S) : Celler et al.

It is certified that error appears in the above-identified patent and that said Letters Patent is hereby corrected as shown below:

On the Title Page, Left Column, at [22] Filed: delete "Feb. 15, 2000" and substitute therefore:

--Nov. 5, 1999--.

In Claim 3, column 21, lines 29-34, please delete

" $0 \leq x_{i1} \leq x_{i2} \cdots \leq x_{i,P_i-1} \leq$ $x_{i,P_i} \geq x_{i,P_i+1} \ldots \geq x_{i,N-1} \geq x_{i,N} \geq 0;$    c)

$0 \leq x_{i1} \leq x_{i2} \cdots \leq x_{i,P_i-v_i}$ and $x_{i,P_i+v_i} \ldots \geq x_{i,N-1} \geq x_{i,N} \geq 0;$   d)"

and insert,

--c)   $0 \leq x_{i1} \leq x_{i2} \cdots \leq x_{i,P_i-1} \leq x_{i,P_i} \geq x_{i,P_i+1} \ldots \geq x_{i,N-1} \geq x_{i,N} \geq 0;$ d)   $0 \leq x_{i1} \leq x_{i2} \cdots \leq x_{i,P_i-v_i}$ and $x_{i,P_i+v_i} \ldots \geq x_{i,N-1} \geq x_{i,N} \geq 0;$--.

In Claim 9, column 22, lines 36-41, please delete

" $0 \leq x_{i1} \leq x_{i2} \cdots \leq x_{i,P_i-1} \leq$                     iii)

$x_{i,P_i} \geq x_{i,P_i+1} \ldots \geq x_{i,N-1} \geq x_{i,N} \geq 0;$ $0 \leq x_{i1} \leq x_{i2} \cdots \leq x_{i,P_i-v_i}$ and $x_{i,P_i+v_i} \ldots \geq x_{i,N-1} \geq x_{i,N} \geq 0;$ iv)"

and insert,

--iii) $0 \leq x_{i1} \leq x_{i2} \cdots \leq x_{i,P_i-1} \leq x_{i,P_i} \geq x_{i,P_i+1} \ldots \geq x_{i,N-1} \geq x_{i,N} \geq 0;$ iv) $0 \leq x_{i1} \leq x_{i2} \cdots \leq x_{i,P_i-v_i}$ and $x_{i,P_i+v_i} \ldots \geq x_{i,N-1} \geq x_{i,N} \geq 0;$ --.

UNITED STATES PATENT AND TRADEMARK OFFICE
CERTIFICATE OF CORRECTION

PATENT NO. : 7,103,204 B1
APPLICATION NO. : 09/435458
DATED : September 5, 2006
INVENTOR(S) : Celler et al.

It is certified that error appears in the above-identified patent and that said Letters Patent is hereby corrected as shown below:

In Claim 24, column 24, lines 9-14, please delete

"$0 \leq x_{i1} \leq x_{i2} \cdots \leq x_{i,P_i-1} \leq x_{i,P_i} \geq x_{i,P_i+1} \cdots \geq x_{i,N-1} \geq x_{i,N} \geq 0;$  iii)

$0 \leq x_{i1} \leq x_{i2} \cdots \leq x_{i,P_i-v_i}$ and $x_{i,P_i+v_i} \cdots \geq x_{i,N-1} \geq x_{i,N} \geq 0;$  iv)"

and insert,

--iii) $0 \leq x_{i1} \leq x_{i2} \cdots \leq x_{i,P_i-1} \leq x_{i,P_i} \geq x_{i,P_i+1} \cdots \geq x_{i,N-1} \geq x_{i,N} \geq 0;$ iv) $0 \leq x_{i1} \leq x_{i2} \cdots \leq x_{i,P_i-v_i}$ and $x_{i,P_i+v_i} \cdots \geq x_{i,N-1} \geq x_{i,N} \geq 0;$ --.

Signed and Sealed this

Thirty-first Day of July, 2007

JON W. DUDAS
*Director of the United States Patent and Trademark Office*